United States Patent

[11] 3,628,987

| [72] | Inventors | Shinsaku Nakata<br>Toyonaka-shi;<br>Hitoshi Hori, Kyoto-shi; Kohei Tagami, Toyonaka-shi; Masaru Suzuki, Osaka-shi, all of Japan |
|---|---|---|
| [21] | Appl. No. | 747,764 |
| [22] | Filed | July 8, 1968 |
| [45] | Patented | Dec. 21, 1971 |
| [73] | Assignee | Sekisui Kagaku Kogyo Kabushiki Kaisha<br>Osaka-shi, Japan |
| [32] | Priorities | July 12, 1967 |
| [33] | | Japan |
| [31] | | 42/45159;<br>Sept. 16, 1967, Japan, No. 42/59814 |

[54] PRESSURE SENSITIVE ADHESIVE FILM
8 Claims, 1 Drawing Fig.

[52] U.S. Cl. .................................................. 117/47 A,
117/4, 117/76 A, 117/118, 117/122 P, 260/5,
260/876 B, 260/878 R, 260/890, 260/899,
260/900
[51] Int. Cl. ..................................................... C09j 7/02
[50] Field of Search .......................................... 117/76 A,
122 P, 47, 118, 4; 260/5, 878, 876 B, 900, 890,
899

[56] References Cited
UNITED STATES PATENTS

| 3,241,662 | 3/1966 | Robinson et al. | 117/122 X |
| 3,265,769 | 8/1966 | Schaffhausen | 117/122 X |
| 2,922,723 | 1/1960 | Lavanchy | 117/76 |
| 3,170,892 | 2/1965 | Busse | 260/859 |
| 3,197,326 | 7/1965 | Webber | 117/76 |
| 3,322,661 | 5/1967 | Yoshikawa et al. | 260/878 X |
| 3,353,987 | 11/1967 | Manaka et al. | 117/47 |
| 3,401,213 | 9/1968 | Trementozzi et al. | 117/122 X |
| 2,999,772 | 9/1961 | Burk et al. | 117/118 |
| 3,101,275 | 8/1963 | Cairns et al. | 117/118 |
| 3,402,059 | 9/1968 | Cohn et al. | 117/4 |

*Primary Examiner*—William D. Martin
*Assistant Examiner*—Bernard D. Pianalto
*Attorney*—Fidelman, Walffe & Leitner

ABSTRACT: This invention relates to pressure sensitive adhesive films wherein the film surface has graft polymerized thereto a vinyl monomer or a diene monomer and wherein an adhesive material overlays the graft polymerized surface. The adhesive material has a solubility parameter near that of polymers of the vinyl or diene monomer.

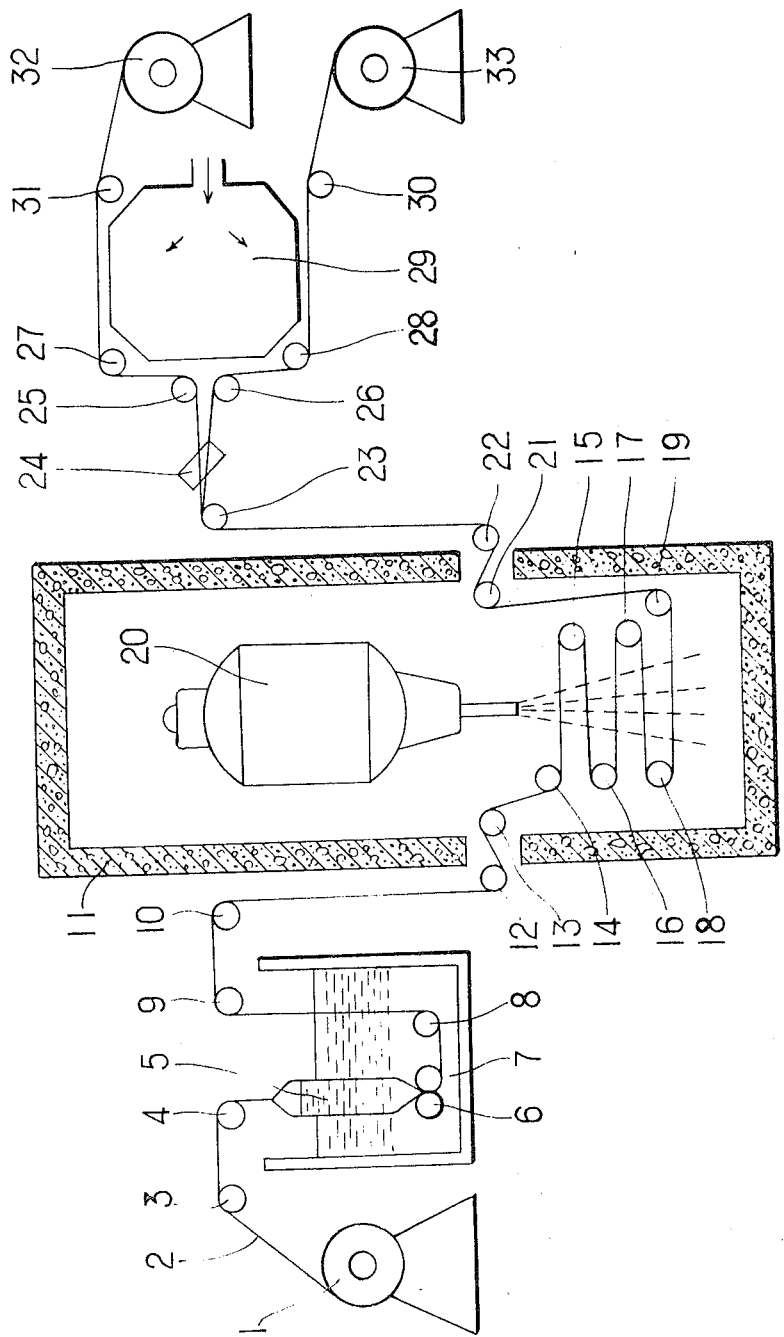

PRESSURE SENSITIVE ADHESIVE FILM

This invention relates to pressure-sensitive adhesive films and to a method for producing thereof. In particular this invention relates to a method for producing pressure-sensitive adhesive films and to the thus obtained pressure-sensitive adhesive film which comprises applying specific monomers to at least a surface of a flexible synthetic resin film, graft polymerizing to improve adhesive property of the surface of said film and applying pressure-sensitive adhesives directly to said surface of the film or after applying a primer to said surface of the film.

The pressure-sensitive adhesive films are known and are already used in the packaging and electrically insulating fields etc. Such known pressure-sensitive adhesive film is generally composed of a flexible film and pressure-sensitive adhesive. The pressure-sensitive adhesive films are made by applying pressure sensitive adhesive to a flexible film. As the flexible film, synthetic resin film, paper and clothes are often times employed. The pressure-sensitive adhesives adhere to the surface of all materials when they are pressed. Pressure-sensitive adhesives having such property are limited to several definite compositions. It is also known that pressure-sensitive adhesives in practical use are generally composed of high-molecular material which may be natural or synthetic rubber, or synthetic resin as the main ingredient thereof and of subsidiary agents thereof such as tackifier, antioxidant and the like, but in the special case of acrylic adhesive the tackifier is not required.

Said pressure-sensitive adhesives adhere to the surface of all materials by strongly pressing. Therefore said pressure-sensitive adhesives themselves adhere firmly to the flexible film in their own nature. However, pressure-sensitive adhesives should be more firmly adhered to the flexible film of the pressure-sensitive adhesive film than to any other material to which pressure-sensitive adhesives are adhered by pressing the pressure-sensitive adhesive film. It is because pressure-sensitive adhesive film should not delaminate in the process of use especially in the following process. Usually pressure-sensitive adhesive film is sold in a wound state around a cylindrical core such as paper core. Therefore it is necessary to unwind the film from said wound state in the use thereof. In this case, if the pressure sensitive adhesives are not adhered firmly to a flexible film, it is delaminated from the film and consequently the pressure-sensitive adhesive film becomes of no use. Further, sometimes it is necessary to remove the pressure-sensitive adhesive film after same was applied by pressing to the articles, as happens in the case of a poorly applied film. In this case, if the pressure-sensitive adhesive is not adhered firmly to the flexible film, the film is peeled off from the pressure-sensitive adhesive and the adhesive remains on the surface of articles, whereby not only the pressure-sensitive adhesive film is not reused but the adhered surface is spoiled by the adhesive remaining thereon. For such reasons a primer is applied on a flexible film and interposed between pressure-sensitive adhesives and flexible film in the pressure-sensitive adhesive tape in order to secure strong adhesion of pressure-sensitive adhesive to the flexible film. Further, releasing treatment is carried out on a nonadhesive surface of the flexible film in order to easily unwind the tape in wound form. Primer applying and releasing treatment are merely means for adhering firmly said pressure-sensitive adhesives to the flexible film.

In known pressure-sensitive adhesive film, adhesion of the pressure-sensitive adhesives to the flexible film is carried out by dissolving pressure-sensitive adhesives in a solvent and applying said solution to a flexible film. In instances, the solvent is not required. Further, when a primer is employed, a solution dissolving said primer is applied to the flexible film and then a solution of pressure-sensitive adhesives. Therefore, it is possible to say that the adhesives are adhered to the flexible film by applying the former on the latter, including the case wherein primer is employed. However, it is not easy to obtain strong adhesion between pressure-sensitive adhesives and the flexible film by merely applying the former on the latter. This is because in some flexible film, especially having flat surface, it is difficult to exhibit sufficient adhesion by only applying the pressure-sensitive adhesives on said film. For example, primers and pressure-sensitive adhesives which exhibit strong adhesion to synthetic resin films, such as polyethylene, polypropylene and polytetrafluoroethylene are not known hitherto.

Many experiments were tried to adhere firmly the pressure-sensitive adhesives or primers to the synthetic resin film by applying the pressure-sensitive adhesives or primer to a surface of synthetic resin film. As the result, it was found that known pressure-sensitive adhesives or primers were adhered firmly to the surface of synthetic resin film when a specific monomer was applied to said synthetic resin film and was graft-polymerized thereon. This invention has been completed based upon confirmation of said result.

An object of this invention is to provide pressure-sensitive adhesive films in which the pressure-sensitive adhesives are adhered firmly to the synthetic resin film.

Further, another object of this invention is to provide a method for producing easily said pressure-sensitive adhesive film in which the pressure-sensitive adhesives are adhered firmly to the synthetic resin film.

These objects of this invention are attained by applying vinyl monomer or diene monomer to a surface of synthetic resin film, graft-polymerizing said monomer to said surface of flexible synthetic film to improve adhesive property of the surface of said flexible synthetic resin film, and applying directly pressure-sensitive adhesives to said graft-polymerized surface or applying same after applying a primer.

This invention is based on the premise that known pressure-sensitive adhesives can be employed as is. Adhesive employable in this invention, however, are not limited to the known pressure-sensitive adhesives, since it is possible to carry out this invention by modifying said known adhesives. Thus this invention extends the range of materials employable as the pressure-sensitive adhesives.

Many kinds of pressure-sensitive adhesives are known, which are generally divided into two types based on the main ingredient of high molecular material contained in said adhesives, that is rubber type pressure-sensitive adhesives and synthetic resin type pressure-sensitive adhesives. As the rubber type adhesives, there are pressure-sensitive natural rubber and/or synthetic rubber as the main ingredient thereof. Among the synthetic rubber, styrene-butadiene rubber, nitrile rubber, butyl rubber, chloroprene rubber, isoprene rubber and isobutylene rubber etc. respectively, may be employed as a main ingredient of the pressure-sensitive adhesives. As the main ingredient of synthetic resin type pressure-sensitive adhesives, polyvinyl chloride, polyvinyl acetate, polyvinyl butyral, polyvinyl ether, polyacrylate, acrylic acid-acrylonitrile copolymer and vinyl chloride-vinyl acetate copolymer, respectively may be employed. Further, said synthetic resin type pressure-sensitive adhesives include sometimes cellulose derivative such as ethyl cellulose, butyl cellulose, benzyl cellulose, nitro cellulose or acetyl cellulose etc. as the main ingredient thereof.

In general, tackifier besides rubber and synthetic resin is included in known pressure-sensitive adhesives in order to give tacky property, but said tackifier is not required for acrylic adhesives. Further, softener for softening said main ingredient and antioxidant for preventing deterioration of said main ingredient are added. As the tackifier, there are polyterpene resin comprising $\alpha$-pinene, and $\beta$-pinene as a main ingredient, rosin comprising abietic ester as the main ingredient, modified rosin prepared by hydrogenating or by esterifying said rosin, cumarone-indene resin and xylene resin etc. As the softener, there are dioctyl phthalate, chloroparaffin, liquid paraffin, liquid polybutene and process oil etc. In short, the known pressure-sensitive adhesives comprise generally said rubber or synthetic resin as the main ingredient, suitable amount of tackifier and softener, and antioxidant. Further there are adhesives in which the tackifier is not contained such as acrylic adhesives. Said tackifier and softener are employed in the amounts of 40 to eight and five to 10 parts respectively based on 100 parts of the main ingredient. Such composition has a property to adhere to a surface of many kinds of articles by pressing.

Hitherto, said pressure-sensitive adhesives were applied to a synthetic resin film by dissolving in a solvent. The amount of the solvent is about four times of solid component thereof. In some cases, the solvent is not employed. In this invention, the pressure-sensitive adhesives are applied by same procedure as in known method on a surface of synthetic resin film or a surface of a primer layer in the form of solution or in the softened state without employing the solvent, which is not different from said prior method. However, in this invention, surface of the synthetic resin film is modified by graft polymerizing a certain monomer thereto before the pressure-sensitive adhesives are applied thereto, which is very different from said prior method.

Synthetic resin film employed in this invention is not limited. Any flexible film consisting of synthetic resin is employable. Though film and sheet are classified by thickness thereof, the synthetic resin film in this invention includes thick matter such as synthetic resin sheet as far as it has flexibility sufficient to conform to the surface of the article. Furthermore, film and tape are classified by width thereof, in general, but the synthetic resin film in this invention includes of course narrow tape. Further, any synthetic resin film having high polarity and low polarity is employable. However, according to this invention adhesion between the synthetic resin film and the pressure-sensitive adhesives is firm, even with films which are difficult to adhere by the prior adhesives. Typical films are polyethylene, polypropylene and polytetrafluoroethylene etc. Films formed by copolymer of ethylene and vinyl acetate comprising 5–50 percent by weight of vinyl acetate are the second typical resin films. Copolymer of ethylene and vinyl chloride is another typical example for improved adhesive property. Further, in general, resins including fluorine are difficult to adhere by adhesives, therefore polymer of chlorotrifluoroethylene and polymer of vinyl fluoride as well as said polytetrafluoroethylene all show remarkable improvement in adhesive ability by this invention. In specific example, film formed from polyethylene terephthalate has a poor adhesive property, therefore said film is effective by this invention. Further, compositions of a mixture of said synthetic resin and another resin such as natural rubber and synthetic rubber are employable in this invention.

The monomer being graft-polymerized to the surface of the synthetic resin film in this invention is classified into two classes. One of them is vinyl monomer and the other is diene monomer. As the vinyl monomer, there are styrene, vinyl acetate, vinyl chloride, acrylonitrile, acrylic acid, acrylate, acrylamide, methacrylic acid and methacrylate etc. As the diene monomer, there are butadiene, chloroprene, and isoprene etc. They are suitable monomers for employing in this invention. These monomers are employed regardless of state that is in gas, liquid or solid state at a room temperature under a normal pressure.

Said vinyl monomer and diene monomer have all similar effect, that is, when said monomers are graft-polymerized to the synthetic film, adhesive property of the film is more or less improved. The degree of the effect thereof is not equal in all of said monomers. Therefore, it is necessary to select a suitable monomer from the vinyl monomer and diene monomer in order to adhere firmly the pressure-sensitive adhesives to the synthetic resin film by graft polymerization. Generally the monomer should depend on the composition of pressure-sensitive adhesives to be applied on the synthetic resin film. Namely, monomer of which polymer has similar polarity to rubber or synthetic resin in the material is adhesives should be selected from said vinyl monomers and diene monomers. Describing quantitatively, the pressure-sensitive adhesives are adhered firmly to the synthetic resin film, when high molecular material having similar solubility parameter to the rubber or synthetic resin in the pressure-sensitive adhesives is selected at first, and the monomer which composes said high-molecular material is graft-polymerized to the synthetic resin film.

It is well-known in adhesive theory that two high-molecular compounds having similar solubility parameter are firmly adhered each other strongly. For example, it is described in "Handbook of Adhesive" p. 11 by I. Skeist that adhesives should be selected on the basis of solubility parameter and polarity. According to said book, solubility parameter of nitrile rubber is 9.4–9.5 and that of polyvinyl chloride is 9.5–9.7. Accordingly, the nitrile rubber and the polyvinyl chloride are firmly adhered each other when they are adhered by using a suitable solvent. Therefore in this invention, when the pressure-sensitive adhesives comprising nitrile rubber as the main ingredient are applied on a surface of a synthetic resin film, it is appropriate to select a vinyl chloride monomer as a suitable monomer to be graft-polymerized to the synthetic resin film. Further, it may be said that it is preferable to employ monomers which form same type or kind of polymer as the rubber or synthetic resin in pressure-sensitive adhesives when it is needed to select a suitable monomer to be graft-polymerized.

There are many methods to graft-polymerize vinyl monomers or diene monomers to the surface of the synthetic resin film. For example, said monomer which is kept in liquid state under a certain condition and which a known polymerization catalyst is added to is applied to a surface of said synthetic resin film. Then, said monomer is made to graft-polymerize to said synthetic resin film by polymerizing through said catalyst. Thus the synthetic resin film having a graft-polymerized surface is obtained. Preferred is a method in which graft-polymerization of monomers on the surface of synthetic resin film takes place by applying ionizing radiation. This method may be divided into two classes. One of them is called as preirradiation method in which a synthetic resin film is activated by applying ionizing radiation and then said monomer is brought in contact with said activated resin film to carry out graft-polymerization. The other method is a direct irradiation method in which said monomer is applied to the surface of synthetic resin film and then ionizing radiation is applied to carry out graft-polymerization on the surface of the film. These two methods may be employed in this invention.

It is necessary to effect graft-polymerization on the surface of synthetic resin film before the pressure-sensitive adhesive is applied thereto. However, when graft-polymer is employed as the primer, composition which forms primer is applied to the film in ungrafted state and then graft-polymerization reaction of the primer and graft-polymerization reaction on the surface of the film occurs at the same time. Therefore, graft-polymerization on the surface of synthetic resin film and formation of primer may be carried out simultaneously.

In this invention, there are two cases, one of which is the case that the pressure-sensitive adhesives are applied directly to a synthetic resin film and the other case in which a primer is applied to a synthetic resin film and then the pressure-sensitive adhesives are applied. Necessity of presence of the primer layer depends on kinds of the pressure-sensitive adhesives employed. When the synthetic resin is employed for a component of pressure-sensitive adhesives, the primer layer is not required in general. However, when said rubber is employed for a component of pressure-sensitive adhesive, necessity of presence of the primer layer depends upon kinds of rubber. For example, when the main ingredient of the pressure-sensitive adhesives has a large polarity such as chloroprene and nitrile rubber, the primer layer is not necessary. However, when the main ingredient thereof has a small polarity such as natural rubber, isoprene rubber, butadiene rubber, butyl rubber and sytrene-butadiene rubber, the primer layer is necessary in general.

As described above, the primer interposes between the synthetic resin film and pressure-sensitive adhesives and functions to adhere firmly both of them. Accordingly, in this invention, the primer should be a material which adheres firmly to both a graft-polymerized surface of synthetic resin film and pressure-sensitive adhesive. These materials which meet said demands are divided into two classes, one of which is a mixture of two high-molecular material as the main ingredient of primer and the other is a graft polymer. The former is a mixture of natural rubber or synthetic rubber and other polymer, said synthetic rubber being of same kind as those contained in pressure-sensitive adhesive, such as polyisoprene rubber, styrene-butadiene rubber and polybutadiene rubber, and said other polymer being of same kind, of same type or of near solubility parameter to the polymer of monomer which was selected from the group consisting of vinyl monomer and diene monomer when synthetic resin film was graft-polymerized. The latter is a graft polymer which is prepared by graft-polymerizing said selected vinyl monomer or diene monomer to natural rubber or synthetic rubber such as isoprene rubber, styrene-butadiene rubber and polybutadiene included in the pressure-sensitive adhesives. In this invention, since the surface of synthetic resin film is graft-polymerized, adhesion between the primer and the synthetic resin film is improved without distinction of said mixture and said graft polymer. Further, this invention has a characteristic that many sorts of graft polymers may be used for the primer, since the surface of synthetic resin film is graft-polymerized.

A method for carrying out this invention will be described as follows.

In order to prepare pressure-sensitive adhesive tape according to the process of this invention, it is necessary to select a monomer to be graft-polymerized to a surface of synthetic resin film from the group consisting of vinyl monomers and diene monomers. As described above, it is preferable to select a monomer which has solubility parameter near that of the main ingredient of pressure-sensitive adhesive or which forms same polymer as in the pressure-sensitive adhesives. Then selected monomer is graft-polymerized on the surface of synthetic resin film. As outlined above any method for graft-polymerizing vinyl monomer or diene monomer to the synthetic resin film may be employed. A method of graft-polymerization by applying ionizing radiation which is a preferred characteristic of this invention will be described in more detail in the following.

As the ionizing radiation for graft-polymerizing said monomer to the synthetic resin film, any radiation may be used such as X-rays, α-rays, β-rays, γ-rays etc. emitted from a X-ray generator, electron or particle accelerator, radio isotope and nuclear reactor. It is necessary to employ 0.1–10 Mrad of radiation to initiate graft-polymerization on the surface of synthetic resin film. It is because, as a result of experiment, it becomes apparent that graft-polymerized synthetic resin film does not adhere to the pressure sensitive adhesive or the primer when the radiation are in less than 0.1 Mrad. It is also because, when radiation exceeds 10 Mrad, not only the method becomes expensive but also the synthetic resin film is deteriorated.

The drawing shows an apparatus for carrying out graft-polymerization of a monomer on the inner surface of a tubular synthetic resin film.

In the FIG. 1 is a tubular synthetic resin film which is folded in flat state and is wound around a core. 2 is an unwound tube. 3, 4, 8, 9, 10 and 12–19 respectively is a guide roll for guiding said tube. 5 is a monomer in liquid state to be graft-polymerized to the inner surface of the synthetic resin film. 6 is a pair of pinch rolls for controlling the amount of monomer adhered to the surface of synthetic film. 7 is water for supporting said tube holding the monomer from outside. 20 is an electron accelerator from which electrons are emitted. 11 is a wall for shielding radiation. 21–23, 25–28, 30 and 31, respectively are guide rolls. 24 is a cutter. 29 is a dryer. 32 and 33, respectively is a winder.

A process in which inner surface of said synthetic resin tube is graft-polymerized and graft-polymerized resin film is obtained in wound form by means of the apparatus described in the drawing is as follows. The monomer 5 is enclosed in an unwound synthetic resin tube and the tube is then pressed by a pair of pinch rolls 6 to make a state such that a small amount of the monomer is applied thereto. Then said tube is exposed to electron beam emitted from an electron accelerator 20, whereby the monomer applied inside surface is graft-polymerized. After graft-polymerization, both selvages of said tube are cut off by a cutter to produce two sheets of film. The films are then dried and wound as a film graft-polymerized on one whole surface thereof.

Said apparatus is not only employed when the monomer to be graft-polymerized on the synthetic resin film is liquid but also is employed with minor modification where the monomer is solid. For example, when said monomer is solid the monomer is dissolved in a suitable solvent to make a solution which is then applied by said apparatus. Further, when said monomer is gas, radiation as applied in a vessel containing said monomer and thus the graft-polymerization takes place on the outer surface of the tube. Furthermore, not only a kind of monomer to be graft-polymerized but a mixture of more than two kinds of monomers may be employed. Thus, it is possible to produce a film to which more than two kinds of monomers are graft-polymerized.

In applying a primer or pressure-sensitive adhesives on a graft-polymerized synthetic resin film, a solution of the primer or pressure-sensitive adhesives dissolved in a solvent thereof is applied to a graft-polymerized surface of synthetic film by a knife coating method, a friction coating method or another coating method.

When a graft polymer is employed as the primer, it is possible as described above to effect graft-polymerization at a surface of the film simultaneously with forming a graft polymer as the primer. Natural or synthetic rubber, for example, isoprene rubber, styrene-butadiene rubber, polyisobutylene etc. is dissolved previously in monomers to be graft-polymerized to the synthetic resin film. The solution is applied to the synthetic resin film and then graft-polymerization is effected by applying ionizing radiation or ultraviolet rays or heating with adding a polymerization catalyst. Thus the monomers are graft-polymerized to the synthetic resin film as well as to the natural or synthetic rubber, consequently the synthetic resin film and the natural or synthetic rubber stick firmly. Then the resulted film is treated by applying known pressure-sensitive adhesives comprising natural or synthetic rubber as the main ingredient, whereby a pressure-sensitive adhesive sheet is produced in which the pressure-sensitive adhesives adhere firmly to the synthetic resin film. In said case, concentration of natural or synthetic rubber dissolved in said monomers is preferably three to 10 parts by weight based on the monomer solution. In a pressure-sensitive adhesive film produced by this invention, polymers of vinyl monomer or diene monomer are formed on the surface of synthetic resin film and said polymers bind chemically to polymers which compose the synthetic resin film. In addition, since pressure-sensitive adhesives or the primer exhibit strong adhesive property to the polymers formed on the surface of said synthetic resin film, the synthetic resin film shows strong adhesive property with said pressure-sensitive adhesives or the primer. Further, since the primer and the pressure-sensitive adhesives have essentially strong adhesive property, the synthetic resin film and the pressure-sensitive adhesives are adhered firmly in the pressure-sensitive adhesive film. Therefore, the invented pressure-sensitive adhesive film has excellent pressure-sensitive tacky property. Furthermore, according to this invention, since the pressure-sensitive adhesives are adhered firmly to the synthetic resin film, ranges of selection of synthetic resin film and of pressure-sensitive adhesives employed are extended and consequently it is possible to produce many kinds of specific pressure-sensitive adhesive films by this invention. In addition, since graft-polymerization of the synthetic resin film is effected readily, production of the pressure-sensitive sensitive adhesive film is easy. Thus this invention brings many effects.

In the following, examples of the method of this invention will be described as well as excellent characteristics of the resulted pressure-sensitive adhesive films.

EXAMPLE 1

In this example, low-density polyethylene film was employed as the synthetic resin film. The polyethylene film was one of the most difficult to adhere pressure-sensitive adhesives thereto.

Methyl methacrylate (a kind of vinyl monomer) was applied in a rate of 20 g./m.$^2$ to an inner surface of a tube having 400 mm. of folded width and 15/100 mm. of thickness produced from low-density polyethylene (Sumikasen F 205 produced by Sumitomo Chemical Co., Ltd.,).

Electron beam having 2 Mev. and 5 ma. were irradiated continuously to the tube at a rate of 10 m./min. by a resonant transformer type electron accelerator (EBG produced by General Electric Co.,). Then the tube was cut to open and the remaining methyl methacrylate was removed by a dryer. Thus a polyethylene film in which methyl methacrylate was grafted to the surface thereof was produced.

On the other hand, copolymers represented by table 1 were prepared as the pressure-sensitive adhesives to be applied. In order to apply to the synthetic resin film, 23 percent solution of copolymers having composition in table 1 in benzene was prepared.

Said solution was applied to the graft-polymerized surface of said polyethylene film at 250 $\mu$ of thickness by a knife coater and dried to evaporate benzene. After then the film was wound around a paper core, and cut in 19 mm. width to prepare a pressure-sensitive adhesive tape.

On thus produced tape, adhesive strength between pressure-sensitive adhesives and a synthetic resin film was measured. A method of measurement was as follows. A tacky surface of each adhesive tape was labeled to each other and the tapes were pressed by 2 kg. rubber rolls with two cycles of going and returning. Thereafter the adhered piece was peeled off at its end. Peeled parts were disposed at 180° each other and were peeled off by adding force to the peeled parts. Adhesive force (anchoring adhesive force) was determined by force when peeling off the piece at a rate of 30 cm. per minute at its adhered part. Results were as shown in table 2.

Further, when same pressure-sensitive adhesives having composition I were applied to a polyethylene film without graft-polymerizing by this invention, anchoring adhesive force was 520 g./19 mm.

Table 1. Composition I

| Monomer which composes copolymer | Parts by weight |
| --- | --- |
| Butyl acrylate | 60 |
| 2-ethyl hexyl acrylate | 20 |
| Methyl methacrylate | 20 |
| Acrylamide | 1.5 |

Table 2. Measurement of Anchoring Adhesive Force.

| Repetition times when irradiated | Amount of graft-polymerized monomer (g./m.$^2$) | Anchoring adhesive force (g./19 mm.) |
| --- | --- | --- |
| 1 | 1.1 | 580 |
| 3 | 5.2 | 1,400 |
| 5 | 10.0 | more than 2,000 |
| 7 | 15.3 | more than 2,000 |

Thus, it was recognized that the adhesives of pressure-sensitive adhesive film were adhered strongly to the polyethylene film.

EXAMPLE 2

In this example, a tacky tape produced by the same procedure as in example 1 but employing vinyl acetate as the monomer to be graft-polymerized instead of methyl methacrylate, composition II described in table 3 as the pressure-sensitive adhesives instead of composition I described in table 1, and acetone-toluene-ethyl acetate as the solvent for dissolving said matter instead of benzene.

Anchoring adhesive force of the resulted tape was determined by the same procedure as in example 1. Results were as shown in table 4.

Further, for comparative purposes, pressure-sensitive adhesive having composition II described in table 3 was applied to a polyethylene film without carrying out graft-polymerization. Anchoring adhesive force thereof was 350 g./19 mm.

Table 3. Composition II

| Composition of pressure sensitive adhesives | Parts by weight |
| --- | --- |
| Vinyl chloride-vinyl acetate copolymer (Slec A produced by Sekisui Chemical Co.) | 70 |
| Butyral resin (S-lec DMF produced by Sekisui Chemical Co.) | 30 |
| Phenolic resin (Super Beccasite 1001 produced by Dainippon Ink Co.) | 80 |
| Dioctyl phthalate (produced by Sekisui Chemical Co.) | 130 |

Table 4. Measurement of Anchoring Adhesive Force

| Repetition times of applied radiation | Amount of graft-polymerized monomer (g./m.$^2$) | Anchoring adhesive force (g./0.9 mm.) |
| --- | --- | --- |
| 1 | 3.8 | 1,250 |
| 3 | 11.5 | more than 2,000 |

Example 3

In this example, a polyethylene tube was employed as the synthetic resin film; methyl methacrylate was employed as the monomer to be graft-polymerized to said tube. Electron beam having 2 Mev. and 5 ma. was irradiated five times at a rate of 10 m./min.

To a surface of thus resulted film, a primer having composition III described in table 5 was applied in an amount of 50 g./m.$^2$. After drying, adhesives having composition IV described in table 6 was applied to at 250 $\mu$ thickness by a roll coater. After drying, the tape was wound round to produce a pressure-sensitive adhesive tape. Anchoring adhesive force of this tape was large.

Table 5. Composition III of a Solution of Primer

| Composition of primer | Parts by weight |
| --- | --- |
| Natural rubber-methyl methacrylate graft polymer (Haveaplus MG-30 produced by Natural Rubber Producer's Association) | 10 |
| Benzene | 90 |

Table 6. Composition IV of a Solution of Adhesives

| Natural rubber | 100 (parts by weight) |
| --- | --- |
| Polyterpene resin | 60 |
| Rosin ester | 50 |
| Cyclohexane (solvent) | 800 |

Example 4

An adhesive tape was produced by the same procedure as in example 3 but changing the primer III in table 5 to an primer V described in table 7 and the adhesives IV in table 6 to adhesives VI described in table 8. Anchoring adhesive force thereof was large.

Table 7. Composition V of a Solution of Primer

| Composition of a solution of undercoating agent | Parts by weight |
| --- | --- |
| Paraloid KM-229 (methyl methacrylate-butadiene-styrene copolymer produced by Rohm and Haas Co.) | 7 |
| JSR 1502 (styrene-butadiene rubber produced | | by Nippon Synthetic rubber CO.) 3
Benzene (solvent) 100

Table 8. Composition VI of a Solution of Adhesives

| Composition of a solution of adhesives | Parts by weight |
|---|---|
| Natural rubber | 50 |
| JSR 1502 (styrene-butadiene rubber produced by Nippon Synthetic rubber Co.) | 50 |
| Polyterpene resin | 20 |
| Rosin ester | 35 |
| Cyclohexane (solvent) | 800 |

EXAMPLE 5

A polyropylene adhesive tape was produced by the same procedure as in example 3 but employing a polypropylene tube (thickness 7/100 mm. folded width 400 mm.) instead of the polyethylene tube. Anchoring adhesive force thereof was large.

EXAMPLE 6

An adhesive tape was produced by the same procedure as in example 3 but employing a mixture of methyl acrylate and acrylonitrile (1:1 by weight) as the monomer and composition VII described in table IX as the primer. Anchoring adhesive force of the resulting pressure-sensitive adhesive film was large.

Table 9. Composition VII of a Solution of Adhesives.

| Composition of a solution of adhesives | Parts by weight |
|---|---|
| Hycar 1,000×132 (acrylonitrile-butadiene rubber produced by The Japanese Geon Co.) | 5 |
| Natural rubber | 5 |
| Methylethyl Ketone-benzene | 90 |

EXAMPLE 7.

An adhesive tape was produced by the same procedure as in example 6 but changing the monomer to following composition. Anchoring adhesive force was large.

| Composition | Parts by weight |
|---|---|
| Vinyl acetate | 20 |
| Acrylonitrile | 80 |

EXAMPLE 8

A solution comprising 10 parts of masticated natural rubber dissolved in 100 parts of methyl methacrylate was applied to an inner surface of a polyethylene tube in a rate of 50 g./m.². After applying electron beam in the same amount as in example 3, the tape was cut to open and adhesives in example 3 were applied thereto. The tape was wound round to produce an adhesive tape. Anchoring adhesive force was large.

EXAMPLE 9

A pressure-sensitive adhesive tape was produced by the same procedure as in example 8 but changing natural rubber dissolved in methyl methacrylate to JSR 1502 (styrene-butadiene rubber, produced by Nippon Synthetic rubber Co.) and employing adhesives in example 4.

In the pressure-sensitive adhesive tapes produced by said example 3–9, it was ascertained the fact that the adhesives adhered firmly to base film, namely that anchoring adhesive force was large, which was determined by the following simple examination. Namely, it was recognized that adhesive neither transfer to the back surface of the resin film when the tape was unwound, nor remained on the surface of the article to which the tape was pressed, not stripped off from the resin film, when the tape was peeled off after it was pressed. Further it was also recognized that, though a treatment in which adhesive surfaces were adhered each other and peeled off immediately was repeated, adhesives were not stripped off.

What is claimed is:

1. A pressure-sensitive adhesive film comprising a flexible synthetic resin film selected from the group consisting of polyethylene and polypropylene, the surface of said film having graft-polymerized thereto at least one graft-polymerizable monomer selected from the group consisting of vinyl monomers and diene monomers, and a pressure-sensitive adhesive having a solubility parameter near that of polymers of said monomer on said graft-polymerized surface.

2. A pressure-sensitive adhesive film as in claim 1 wherein said adhesive is a rubber type adhesive.

3. A pressure-sensitive adhesive film as in claim 2 wherein a principal ingredient of the adhesive is a graft polymer of the same monomer to rubber.

4. A pressure-sensitive adhesive film as in claim 1 wherein said adhesive is a synthetic resin type adhesive.

5. A pressure-sensitive adhesive film comprising a flexible synthetic resin film selected from the group consisting of polyethylene and polypropylene, the surface of said film having graft-polymerized thereto at least one graft-polymerizable monomer selected from the group consisting of vinyl monomers and diene monomers, a primer having a solubility parameter near that of polymers of said monomer on said graft-polymerized surface, and a pressure-sensitive adhesive on said primer.

6. A pressure-sensitive adhesive film as in claim 5 wherein a principal ingredient of the primer is the graft polymer.

7. A pressure-sensitive adhesive film as in claim 5 wherein a principal ingredient of the primer is rubber.

8. A pressure-sensitive adhesive film as in claim 5 wherein a principal ingredient of the primer is a synthetic resin.

* * * * *